(12) United States Patent
Li

(10) Patent No.: US 11,659,455 B2
(45) Date of Patent: May 23, 2023

(54) PROCESSING METHOD AND APPARATUS FOR CELL HANDOVER

(71) Applicant: BEIJING XIAOMI MOBILE SOFTWARE CO., LTD., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 270 days.

(21) Appl. No.: 17/057,441

(22) PCT Filed: May 30, 2018

(86) PCT No.: PCT/CN2018/089059
§ 371 (c)(1),
(2) Date: Nov. 20, 2020

(87) PCT Pub. No.: WO2019/227350
PCT Pub. Date: Dec. 5, 2019

(65) Prior Publication Data
US 2021/0211946 A1    Jul. 8, 2021

(51) Int. Cl.
*H04W 36/32* (2009.01)
*H04W 36/00* (2009.01)
*H04W 36/24* (2009.01)

(52) U.S. Cl.
CPC ... *H04W 36/0055* (2013.01); *H04W 36/0077* (2013.01); *H04W 36/245* (2013.01); *H04W 36/32* (2013.01)

(58) Field of Classification Search
CPC ......... H04W 36/0055; H04W 36/0077; H04W 36/245; H04W 36/32; H04W 36/00835
See application file for complete search history.

(56) References Cited

U.S. PATENT DOCUMENTS

| 8,743,723 B2 | 6/2014 | Watfa |
| 2008/0130585 A1 | 6/2008 | Park |
| 2010/0323715 A1 | 12/2010 | Winters |
| 2010/0330991 A1 | 12/2010 | Sydir |

(Continued)

FOREIGN PATENT DOCUMENTS

| CN | 101114166 A | 1/2008 |
| CN | 101527944 A | 9/2009 |

(Continued)

OTHER PUBLICATIONS

Second Office Action of the Chinese application No. 201880000717.2, dated Mar. 3, 2021.

(Continued)

*Primary Examiner* — Barry W Taylor
(74) *Attorney, Agent, or Firm* — Syncoda LLC; Feng Ma

(57) ABSTRACT

A processing method includes: obtaining a current movement trajectory; matching the current movement trajectory with history movement trajectories and obtaining matching degrees; determining a target cell according to a history movement trajectory having the matching degree greater than a preset matching threshold and a correspondence between the history movement trajectory and a cell; and sending a handover request to a source base station, the handover request comprising a determined target cell identifier of the target cell.

14 Claims, 18 Drawing Sheets

(56) References Cited

U.S. PATENT DOCUMENTS

| | | | |
|---|---|---|---|
| 2012/0113843 A1 | 5/2012 | Watfa | |
| 2014/0323130 A1* | 10/2014 | Kowshik | H04W 36/245 455/436 |
| 2015/0038143 A1* | 2/2015 | Kilpatrick, II | H04W 36/245 455/436 |
| 2017/0041841 A1* | 2/2017 | Pedersen | H04W 36/0072 |
| 2018/0049078 A1* | 2/2018 | Yang | H04W 36/36 |
| 2019/0306768 A1* | 10/2019 | Kim | H04W 36/00835 |
| 2020/0037217 A1* | 1/2020 | Shapiro | H04W 36/08 |
| 2020/0351729 A1* | 11/2020 | Rastegardoost | H04W 36/0072 |
| 2022/0164411 A1* | 5/2022 | Jain | G06N 3/045 |

FOREIGN PATENT DOCUMENTS

| | | |
|---|---|---|
| CN | 101562851 A | 10/2009 |
| CN | 102244907 A | 11/2011 |
| CN | 107911848 A | 4/2018 |
| CN | 103888978 B | 5/2018 |
| JP | 6245465 B2 | 12/2017 |
| KR | 101367476 B1 | 2/2014 |
| WO | 2017195497 A1 | 11/2017 |

OTHER PUBLICATIONS

Supplementary European Search Report in the European application No. 18920788.9, dated Dec. 8, 2021.

Office Action of the Indian application No. 202047054975, dated Dec. 22, 2021.

International Search Report in the international application No. PCT/CN2018/089059, dated Feb. 22, 2019.

English Translation of the Written Opinion of the International Search Authority in the international application No. PCT/CN2018/089059, dated Feb. 22, 2019.

First Office Action of the Chinese application No. 201880000717.2, dated Jul. 13, 2020.

\* cited by examiner

PROCESSING METHOD AND APPARATUS FOR CELL HANDOVER

CROSS-REFERENCE TO RELATED APPLICATIONS

This application is a national stage of International Application No. PCT/CN2018/089059 filed on May 30, 2018, the disclosure of which is hereby incorporated by reference in its entirety.

TECHNICAL FIELD

The disclosure relates to the technical field of communications, and more particularly to a method and device for processing cell handover.

BACKGROUND

In the related art, user equipment needs frequent cell handover in a moving process in order to gain a good mobile communication environment and guarantee a good mobile service quality. Before cell handover, the user equipment often sends a measurement report to a source base station according to a pre-configured measurement mechanism. The source base station determines whether cell handover is required to be initiated according to a measurement result in the measurement report, and determines a target base station and implements the cell handover process if cell handover is required. However, the measurement result may not be accurate due to environmental influences, resulting in that the timing for initiating cell handover and the determined target base station may not be appropriate, and affecting the mobile service quality and power consumption of the user equipment.

SUMMARY

The embodiments of the disclosure provide a method and device for processing cell handover. The technical solutions are described as follows.

According to a first aspect of the embodiments of the disclosure, a method for processing cell handover is provided. The method is applied to user equipment side and includes operations as follows.

A current movement trajectory is obtained.

The current movement trajectory is matched with historical movement trajectories, to obtain matching degrees.

A target cell is determined according to the historical movement trajectory of the matching degree greater than a preset matching threshold and correspondences between the historical movement trajectories and cells.

A handover request is sent to a source base station, and the handover request includes a target cell identifier of the determined target cell.

The technical solution provided by the embodiment of the disclosure may have the following beneficial effects. According to the embodiment, possible target cells may be estimated in advance according to a movement trajectory of the user equipment, and cell handover is performed by referring to the estimated target cell, which facilitates improving a success rate and stability of handover.

In an embodiment, the method may further include operations as follows.

A current time is obtained.

A historical time associated with the current time is determined.

The operation that the current movement trajectory is matched with the historical movement trajectories may include an operation.

The current movement trajectory is matched with a historical movement trajectory corresponding to the historical time.

The technical solution provided by the embodiment of the disclosure may have the following beneficial effects. According to the embodiment, the movement trajectories may be matched accurately based on a time, and the target cell may be determined accurately.

In an embodiment, the method may further include an operation as follows.

A current movement speed is obtained.

The operation that the target cell is determined according to the historical movement trajectory of the matching degree greater than a preset matching threshold and correspondences between the historical movement trajectories and cells may include an operation as follows.

The target cell is determined according to the historical movement trajectory of the matching degree greater than the preset matching threshold, the current movement speed, and correspondences among the historical movement trajectories, the movement speeds and the cells.

The technical solution provided by the embodiment of the disclosure may include the following beneficial effects. According to the embodiment, a suitable target cell may be determined according to the movement speed, thereby reducing frequent handover of cells.

In an embodiment, the method may further include an operation as follows.

A handover time is determined according to the current movement speed and the determined target cell.

The handover request may further include the determined handover time.

The technical solution provided by the embodiment of the disclosure may have the following beneficial effects. The embodiment may predict the handover time and provide a handover preparation time.

In an embodiment, the handover request may further include a measurement report.

The technical solution provided by the embodiment of the disclosure may have the following beneficial effect. In the embodiment, the measurement report is reported, for providing a reference to the base station for cell handover.

According to a second aspect of the embodiment of the disclosure, a method for processing cell handover is provided. The method is applied to a base station side and includes operations as follows.

A handover request sent by user equipment is received. The handover request includes a target cell identifier.

A target base station is determined according to the target cell identifier.

The handover request is sent to the target base station.

The technical solution provided by the embodiment of the disclosure may include the following beneficial effects. In the embodiment, a base station may parse the target cell identifier reported by the user equipment and determine a suitable target base station by referring to the target cell.

In an embodiment, the handover request may further include a handover time.

The operation that the handover request is sent to the target base station may include an operation as follows.

The handover request is sent to the target base station before the handover time is reached.

The method may further include operations as follows.

A handover preparation process is executed with the target base station before the handover time is reached.

A handover command is sent to the user equipment according to the handover time.

The technical solution provided by the embodiment of the disclosure may have the following beneficial effects. In the embodiment, the base station may parse the handover time, perform handover preparation according to the handover time, and perform handover according to the handover time, thereby improving the success rate of handover.

In an embodiment, the handover request may further include a measurement report.

The operation that the target base station is determined according to the target cell identifier may include an operation as follows.

The target base station is determined according to the target cell identifier and the measurement report.

The technical solution provided by the embodiment of the disclosure may have the following beneficial effect. In the embodiment, the base station may perform the handover process with reference to the measurement report.

According to a third aspect of the embodiment of the disclosure, a device for processing cell handover is provided, which includes a trajectory obtaining module, a matching module, a cell module and a sending module.

A trajectory obtaining module is configured to obtain a current movement trajectory.

A matching module is configured to match the current movement trajectory with historical movement trajectories to obtain matching degrees.

A cell module is configured to determine a target cell according to the historical movement trajectory of the matching degree greater than a preset matching threshold and correspondences between the historical movement trajectories and cells.

A sending module is configured to send a handover request to a source base station. The handover request includes a target cell identifier of the determined target cell.

In an embodiment, the device may further include a time obtaining module and a historical time module.

The time obtaining module is configured to obtain a current time.

The historical time module is configured to determine a historical time associated with the current time.

The matching module may include a first matching sub-module.

The first matching sub-module is configured to match the current movement trajectory with a historical movement trajectory corresponding to the historical time.

In an embodiment, the device may further include a speed obtaining module.

The speed obtaining module is configured to obtain a current movement speed.

The matching module may include a second matching sub-module.

The second matching sub-module is configured to determine the target cell according to the historical movement trajectory of the matching degree greater than the preset matching threshold, the current movement speed, and correspondences among the historical movement trajectories, the movement speeds and the cells.

In an embodiment, the device may further include a handover time module.

The handover time module is configured to determine a handover time according to the current movement speed and the determined target cell.

The handover request may further include the determined handover time.

In an embodiment, the handover request may further include a measurement report.

According to a fourth aspect of the embodiment of the disclosure, a device for processing cell handover is provided, which includes a receiving module and a determining module, a first sending module.

The receiving module is configured to receive a handover request sent by user equipment. The handover request includes a target cell identifier.

The determining module is configured to determine a target base station according to the target cell identifier.

The first sending module is configured to send the handover request to the target base station.

In an embodiment, the handover request may further include a handover time.

The sending module may include a sending sub-module.

The sending sub-module is configured to send the handover request to the target base station before the handover time is reached.

The device may further include a handover preparation module and a second sending module.

The handover preparation module is configured to execute a handover preparation process with the target base station before the handover time is reached.

The second sending module is configured to send a handover command to the user equipment according to the handover time.

In an embodiment, the handover request may further include a measurement report.

The determining module may include a determining sub-module.

The determining sub-module is configured to determine the target base station according to the target cell identifier and the measurement report.

According to a fifth aspect of the embodiment of the disclosure, a device for processing cell handover is provided, which includes a processor; a memory configured to store processor-executable instructions.

The processor is configured to: obtain a current movement trajectory; match the current movement trajectory with historical movement trajectories to obtain matching degrees; determine a target cell according to the historical movement trajectory of the matching degree greater than a preset matching threshold and correspondences between the historical movement trajectories and cells; and send a handover request to a source base station. The handover request includes a target cell identifier of the determined target cell.

According to a sixth aspect of the embodiment of the disclosure, a device for processing cell handover is provided, which includes a processor; and a memory configured to store processor-executable instructions.

The processor is configured to: receive a handover request sent by user equipment, the handover request including a target cell identifier; determine a target base station according to the target cell identifier; and send the handover request to the target base station.

According to a seventh aspect of the embodiment of the disclosure, a computer-readable storage medium having stored therein computer instructions is provided, the instructions, when executed by a processor, implement the above-described method on the user equipment side.

According to an eighth aspect of the embodiment of the disclosure, a computer-readable storage medium having stored therein computer instructions is provided, the instructions, when executed by a processor, implement the above-described method on the base station side.

It should be understood that the above general description and the following detailed description are exemplary and explanatory, and are not intended to limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. On the contrary, the implementations are merely examples of devices and methods consistent with some aspects of the disclosure as detailed in the appended claims.

In the related art, user equipment reports a measurement report to a base station. The base station determines whether the user equipment needs to perform cell handover based on the measurement report. However, the measurement result may not be accurate due to environmental influences, resulting in that the timing of initiating cell handover and a determined target base station may not be appropriate, the quality of communication service after handover to a target cell is poor, or frequent handover (or ping-pong handover) between two cells occurs. In this way, the quality of communication service is affected, more network resources are wasted, and more device power is consumed.

In order to solve the above-mentioned problems, in the embodiment, the user equipment estimates a target cell according to movement trajectories and reports the target cell to a source base station. The source base station determines an accurate target cell for handover by referring to the target cell of the user equipment, thereby improving a success rate of cell handover, and reducing ping-pong handover.

Figure 1:
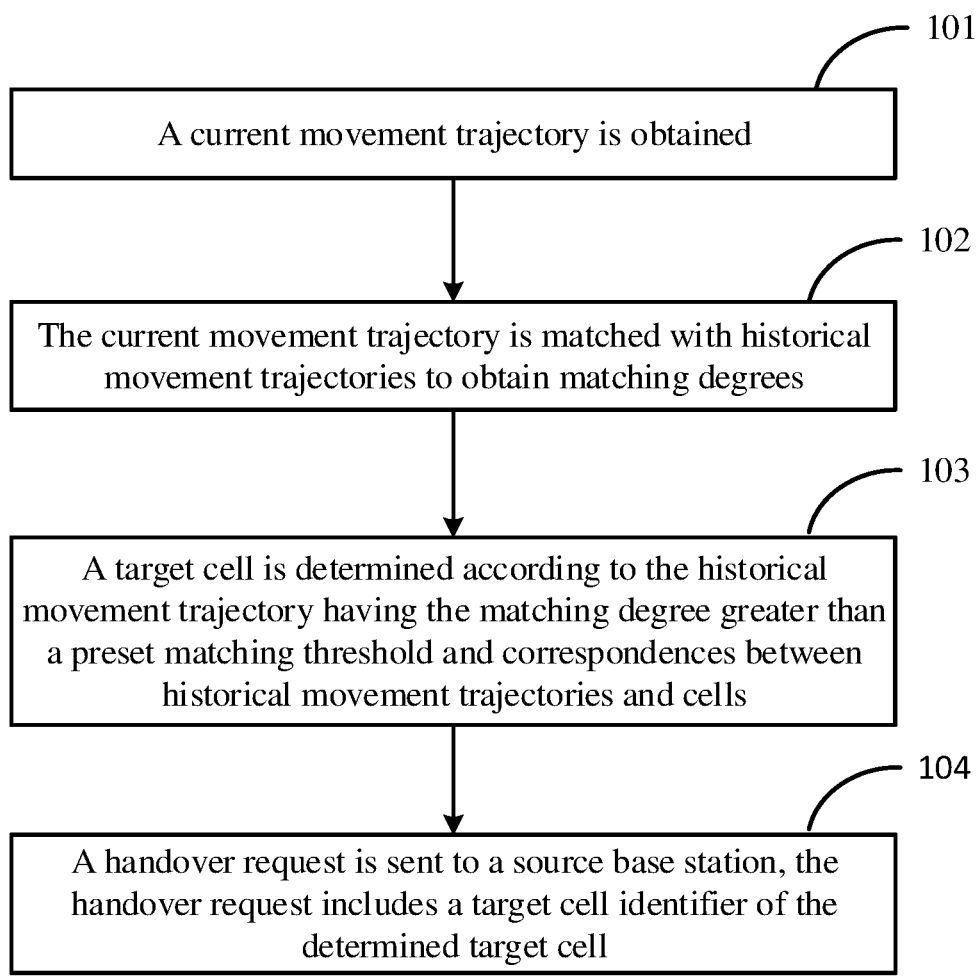
FIG. 1 is a flow chart showing a method for processing cell handover according to an exemplary embodiment.

FIG. 1 is a flow chart showing a method for processing cell handover according to an exemplary embodiment. The method for processing cell handover may be applied to user equipment. The user equipment may be a mobile phone, a computer, a digital broadcasting terminal, messaging equipment, a game console, tablet equipment, medical equipment, fitness equipment, a personal digital assistant, etc. As shown in FIG. 1, the method includes the following operations 101 to 104.

At 101, a current movement trajectory is obtained.

At 102, the current movement trajectory is matched with historical movement trajectories to obtain matching degrees.

At 103, a target cell is determined according to the historical movement trajectory of the matching degree greater than a preset matching threshold and correspondences between the historical movement trajectories and cells.

At 104, a handover request is sent to a source base station. The handover request includes a target cell identifier of the determined target cell.

If there is no historical movement trajectory of the matching degree greater than the preset matching threshold, the flow ends, and there is no need to determine the target cell or report a measurement report.

In the embodiment, the user equipment starts obtaining the current movement trajectory when moving or when a movement speed is greater than a preset speed threshold (such as a time speed of 20 kilometers and 40 kilometers). When the user equipment is basically stationary or the movement speed is not greater than the speed threshold, it is not required to obtain the current movement trajectory, and the solution of the embodiment may not be adopted because it is not likely to perform cell handover. At rest, an implementation solution for reporting the measurement report in the related art may be adopted.

The current movement trajectory may be a movement trajectory from a starting time of movement to a current time, or a movement trajectory within a last period of time (e.g. within 1 hour), or a movement trajectory within a last distance (e.g. 20 km).

The user equipment stores historical movement trajectories in advance. The historical movement trajectories may be movement trajectories which are generated by the user equipment previously, and may include movement trajectories that are generated by other user equipment previously, the historical movement trajectories are obtained by a network side. The current movement trajectory in 101 may also serve as a historical movement trajectory in the future. The historical movement trajectories may consist of multiple movement trajectories.

The current movement trajectory and the historical movement trajectories are different in length. Therefore, the obtained matching degree may be a ratio of a coinciding portion of the current movement trajectory with the historical movement trajectory to a shorter one of the current movement trajectory and the historical movement trajectory. The matching threshold may be configured according to actual needs, the greater the matching threshold, the more accurate the determined target cell. The matching threshold is for example 60%, 80% and 90%. In 102, algorithms such as fuzzy matching, approximate matching and aggregation may be employed to determine the coinciding portion.

The user equipment pre-stores correspondences between the historical movement trajectories and the cells. The cells in the correspondences may be a cell accessed by the user equipment on the historical movement trajectory or a cell configured by the network side. The network side may plan a suitable cell according to the movement trajectory.

According to the historical movement trajectory obtained through matching, a future movement trajectory may be predicted, a cell covering the future movement trajectory is likely to be a cell which is to cover the user equipment, and the cell is taken as the target cell, for providing good communication service to the user equipment.

After determining the target cell, the user equipment may send a handover request, which may be a Radio Resource Control (RRC) message, to the source base station. The handover request may be identified by a particular flag bit or a particular value of a flag bit. The handover request carries the target cell identifier of the target cell.

In the embodiment, when the user equipment moves initially, a movement trajectory is short, and may match with multiple historical movement trajectories with a high matching degree. Since a large number of historical movement trajectories are matched, the number of determined target cells may be large. In this case, all the determined target cells may be reported to the source base station. Alternatively, the determined target cells are not reported if there are a larger number of target cells.

With continuous movement of the user equipment, the current movement trajectory becomes long, the number of the historical movement trajectories of a great matching degree gradually becomes small, the matching accuracy becomes large, and the number of determined target cells becomes small. In this case, a reported target cell is more accurate.

The embodiment provides an implementation that the user equipment determines and reports the target cell according to the movement trajectories. The user equipment may determine the target cell according to the movement trajectory thereof, and the target cell may provide a better coverage for future possible movement trajectories of the user equipment, thereby improving a success rate of cell handover, ensuring the quality of communication service after handover, and reducing the occurrence of ping-pong handover.

In an embodiment, the method further includes operations A1 and A2.

In A1, a current time is obtained.

In A2, a historical time associated with the current time is determined.

The operation 102 includes an operation A3.

In A3, the current movement trajectory is matched with a historical movement trajectory corresponding to the historical time.

The current time in the embodiment may include the hour and the minute, such as 8:00, and may further include the year, the month, the day, etc. The embodiment may take only the hour and minute into consideration. The historical time associated with the current time may be a historical time containing the same hour and minute as the current time, and multiple historical days contains the hour and minute. The multiple days may be multiple days within a preset duration, such as 8:00 every day in the last month, or 8:00 every day in the last year. The embodiment is suitable for a condition that the movement trajectory circulates daily. For example, a movement trajectory that a user goes to and goes off work every day has the characteristic of circulating daily. The current time is a time when the user goes to work currently, and the associated historical time is a time when the user went to work in the past month.

Alternatively, the current time may include the week, the hour and the minute, such as 8:00 on Monday. The associated historical time may be 8:00 each Monday in the past month, or 8:00 each Monday in the past year. The embodiment is suitable for a condition that the movement trajectory circulates weekly, for example, the user goes to a specific place once a week.

The embodiment may also be suitable for a condition of circulating monthly or yearly, which will not be described in detail here.

The current time may be a time period corresponding to the current movement trajectory. The historical time may be a time period corresponding to the historical movement trajectory. When the current time and the historical time have a coincident time period, the historical time is the historical time associated with the current time.

In A3, the current movement trajectory participating in matching may be a movement trajectory corresponding to the current time period, or a part of the current movement trajectory corresponding to the coincident time period. The historical movement trajectory participating in matching may be a movement trajectory corresponding to the associated historical time or a part of the historical movement trajectory corresponding to the coincident time period.

In an embodiment, the method further includes an operation B1.

In B1, a current movement speed is obtained.

The operation 103 includes an operation B2.

In B2, the target cell is determined according to the historical movement trajectory of the matching degree greater than the preset matching threshold, the current movement speed, and correspondences among historical movement trajectories, movement speeds and cells.

In the embodiment, the current movement speed may be a current instantaneous speed or an average speed over the last period of time.

A location on the historical movement trajectories may be covered by multiple cells. The cells may be grouped into a microcell, a cell, a macrocell and the like according to coverage areas. The microcell, the cell and the macrocell may cover the same location. The embodiment may determine the target cell according to the movement speed of the user equipment. For example, in response to that the movement speed is in a first speed range (e.g., less than 40 km/h), a microcell covering the movement trajectory is determined as the target cell. In response to that the movement speed is in a second speed range (e.g., not less than 40 km/h and less than 80 km/h), a cell covering the movement trajectory is determined as the target cell. In response to that the movement speed is in a third speed range (e.g., not less than 80 km/h), a macro cell covering the movement trajectory is determined as the target cell.

According to the embodiment, the target cell may be determined more accurately according to the movement speed.

In an embodiment, the method further includes an operation C1.

In C1, a handover time is determined according to the current movement speed and the determined target cell.

The handover request further includes the determined handover time.

In the embodiment, the user equipment may predict a future possible movement trajectory according to the matched historical movement trajectories, may know which cell covers the future possible movement trajectory, and may predict a time taken to reach or get close to the target cell, that is, the handover time, according to the current movement speed. The handover time may be a relative time, for example a duration (e.g., 2 minutes) relative to the current time, or an absolute time, such as XX:XX:XX.

The user equipment reports the handover time to the source base station. The source base station and the target base station may perform handover preparation in advance, thereby improving the success rate of handover.

In an embodiment, the handover request further includes a measurement report.

The user equipment may also report the measurement report to the base station, and the handover request in the embodiment may carry the measurement report, thereby saving signaling resources. The base station may comprehensively determine whether to perform cell handover and which target cell to switch to by referring to the measurement report and the reported target cell. More reference information is provided to the base station, thereby improving determination accuracy of the base station, and further improving accuracy of cell handover.

The implementation process is described in detail below by means of several embodiments.

Figure 2:
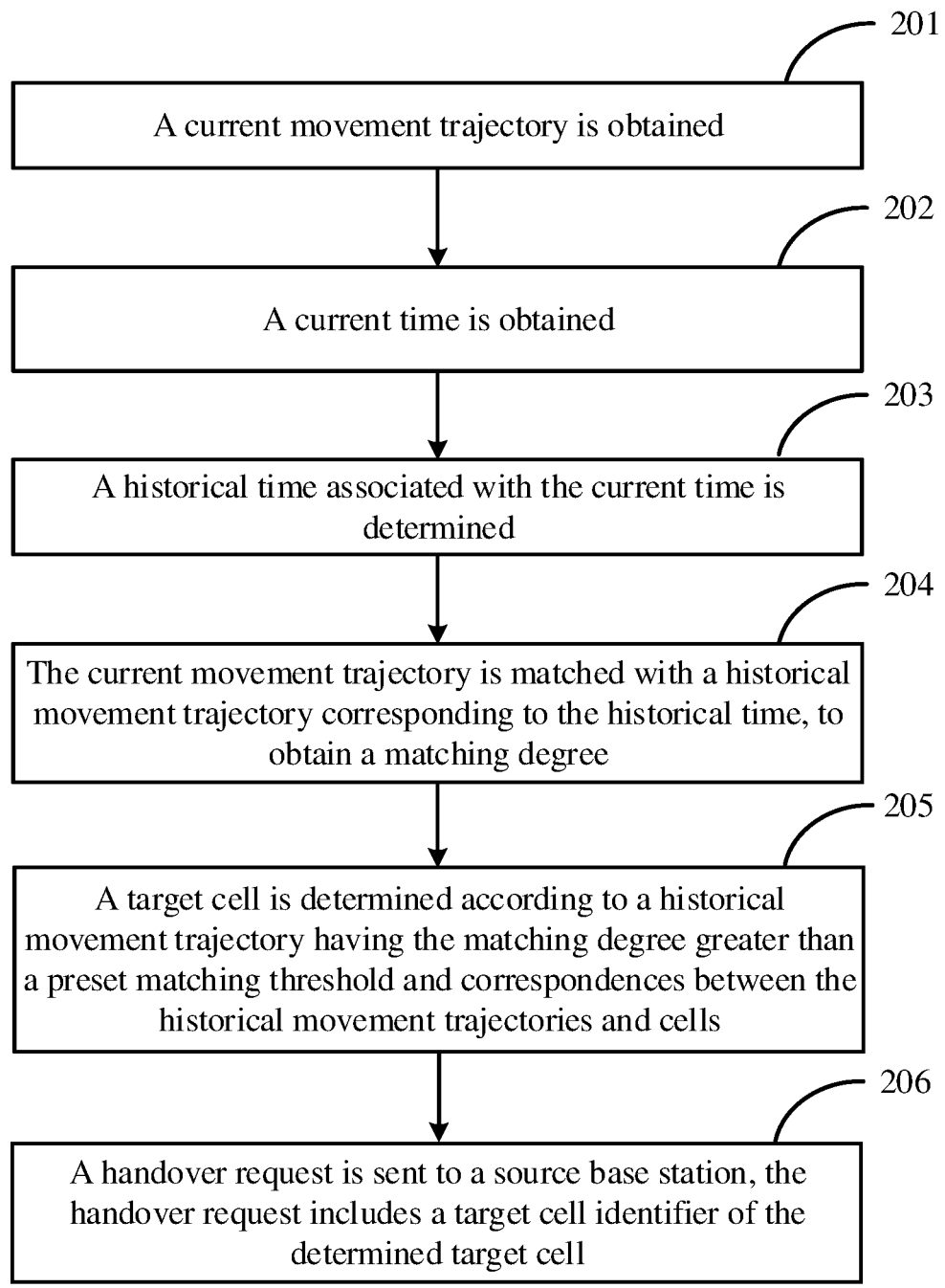
FIG. 2 is a flow chart showing a method for processing cell handover, according to an exemplary embodiment.

FIG. 2 is a flow chart showing a method for processing cell handover according to an exemplary embodiment. The method for processing cell handover is applied to user equipment. The user equipment may be a mobile phone, a computer, a digital broadcasting terminal, messaging equipment, a game console, tablet equipment, medical equipment, fitness equipment, a personal digital assistant, etc. As shown in FIG. 2, the method includes the following operations 201 to 206.

In 201, a current movement trajectory is obtained.

In 202, a current time is obtained.

In 203, a historical time associated with the current time is determined.

In 204, the current movement trajectory is matched with historical movement trajectories corresponding to the historical time, to obtain matching degrees.

In 205, a target cell is determined according to a historical movement trajectory of the matching degree greater than a preset matching threshold and correspondences between the historical movement trajectories and cells.

In 206, a handover request is sent to a source base station. The handover request includes a target cell identifier of the determined target cell.

Figure 3:
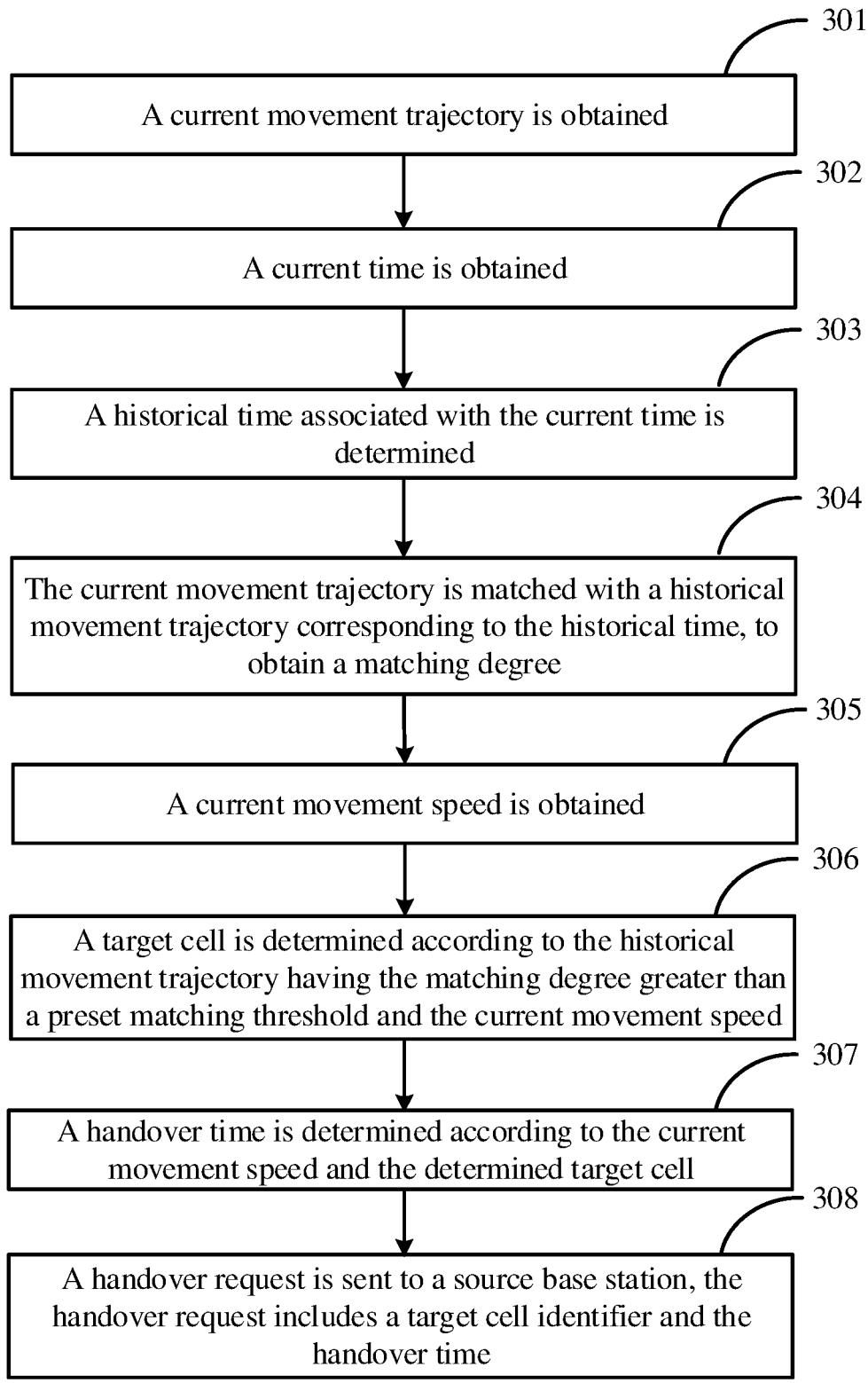
FIG. 3 is a flow chart showing a method for processing cell handover according to an exemplary embodiment.

FIG. 3 is a flow chart showing a method for processing cell handover according to an exemplary embodiment. The method for processing cell handover is applied to user equipment. The user equipment may be a mobile phone, a computer, a digital broadcasting terminal, messaging equipment, a game console, tablet equipment, medical equipment, fitness equipment, a personal digital assistant, etc. As shown in FIG. 3, the method includes the following operations 301 to 308.

In 301, a current movement trajectory is obtained.

In 302, a current time is obtained.

In 303, a historical time associated with the current time is determined.

In 304, the current movement trajectory is matched with a historical movement trajectory corresponding to the historical time, to obtain a matching degree.

In 305, a current movement speed is obtained.

In 306, a target cell is determined according to the historical movement trajectory of the matching degree greater than a preset matching threshold, the current movement speed, and correspondences among historical movement trajectories, movement speeds and cells.

In 307, a handover time is determined based on the current movement speed and the determined target cell.

In 308, a handover request is sent to a source base station. The handover request includes a target cell identifier and the handover time.

The implementation process of user equipment side is introduced above, and a base station side is improved correspondingly. The implementation process of the base station side is introduced below.

Figure 4:
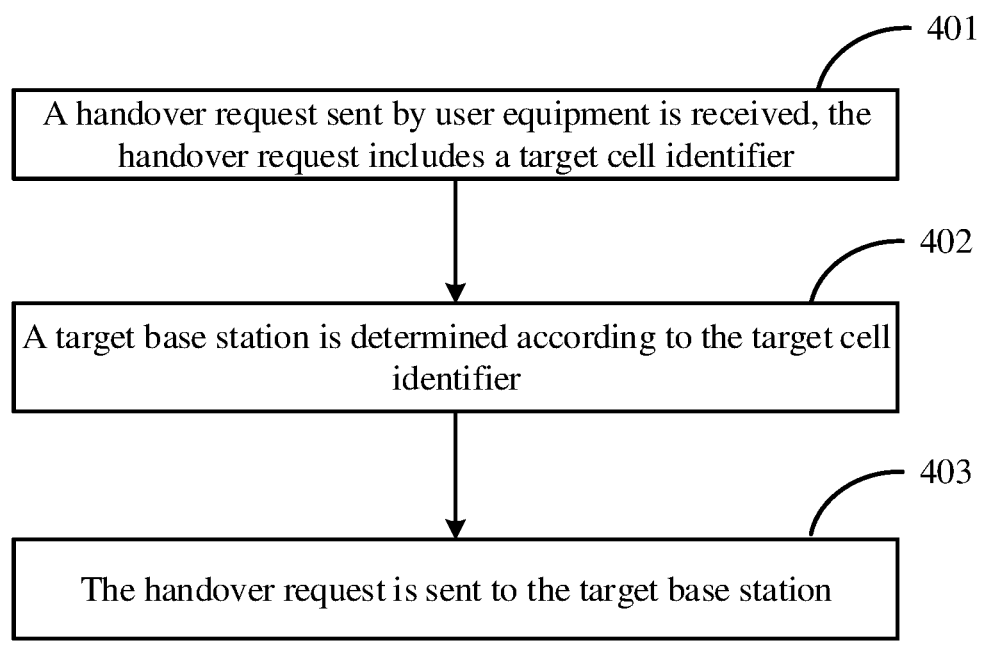
FIG. 4 is a flow chart showing a method for processing cell handover according to an exemplary embodiment.

FIG. 4 is a flow chart showing a method for processing cell handover according to an exemplary embodiment. The method for processing cell handover is applied to an access network device such as a base station. As shown in FIG. 4, the method includes the following operations 401 to 403.

In 401, a handover request sent by user equipment is received. The handover request includes a target cell identifier.

In 402, a target base station is determined based on the target cell identifier.

In 403, the handover request is sent to the target base station.

In the embodiment, a source base station may take a target cell indicated by the handover request as a target cell for actual handover. Alternatively, the target cell indicated by the handover request serves as an alternative target cell, which is configured with a high priority or weight. A target cell for final actual handover is determined with reference to other factors such as a measurement report.

The source base station may send the handover request to the target base station upon receiving the handover request, and negotiate a handover process with the target base station to implement cell handover.

Alternatively, in an embodiment, the handover request further includes a handover time.

The operation 403 includes an operation D1.

In D1, the handover request is sent to the target base station before the handover time is reached.

The method further includes operations D2 and D3.

In D2, a handover preparation process is executed with the target base station before the handover time is reached.

In D3, a handover command is sent to the user equipment according to the handover time.

In the embodiment, the source base station negotiates a handover process with the target base station before the handover time is reached, to complete handover preparation, and the handover command is sent to the user equipment when the handover time is reached or close, to enable the user equipment to be switched to the target cell. In this way, a high success rate of handover may be achieved. The user equipment is switched to the target cell in time, and the target cell may provide good network communication service for the user equipment.

The handover preparation process includes an operation that the target base station sends a handover response message to the source base station. The handover response message includes handover related information such as a new C-RNTI and a security algorithm identifier of the target base station. Also, the source base station and the target base station each perform handover preparation of L1 (Layer 1)/L2 (Layer 2).

After the source base station sends the handover command to the user equipment, the user equipment is switched to the target base station, and a movement trajectory is updated, and the above-mentioned embodiments is repeated.

In an embodiment, the handover request further includes a measurement report.

The operation that the target base station is determined according to the target cell identifier includes an operation E1.

In E1, the target base station is determined according to the target cell identifier and the measurement report.

In the embodiment, the handover request may further carry the measurement report. By referring to the measurement report and the target cell reported by the user equipment, the source base station may determine the target cell for final actual handover, and further determine the target base station. The target cell determined in combination various factors is more accurate.

The implementation process of the base station side is described in detail by the embodiments below.

Figure 5:
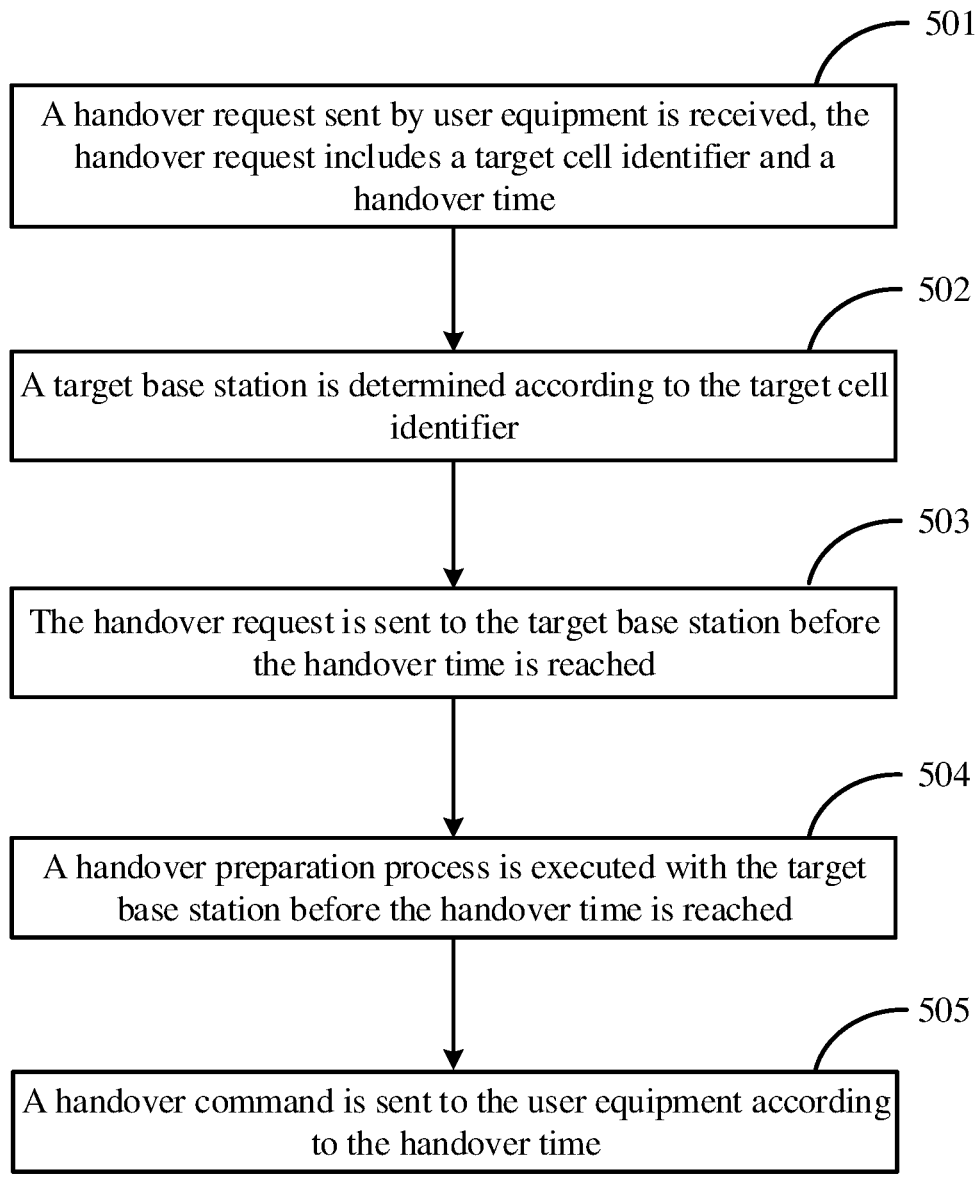
FIG. 5 is a flow chart showing a method for processing cell handover, according to an exemplary embodiment.

FIG. 5 is a flow chart showing a method for processing cell handover according to an exemplary embodiment. The method for processing cell handover is applied to an access network device such as a base station. As shown in FIG. 4, the method includes the following operations 501 to 505.

In 501, a handover request sent by user equipment is received. The handover request includes a target cell identifier and a handover time.

In 502, a target base station is determined based on the target cell identifier.

In 503, the handover request is sent to the target base station before the handover time is reached.

In 504, a handover preparation process is executed with the target base station before the handover time is reached.

In 505, a handover command is sent to the user equipment according to the handover time.

The implementation process is described below in connection with both the user equipment side and the base station side.

Figure 6:
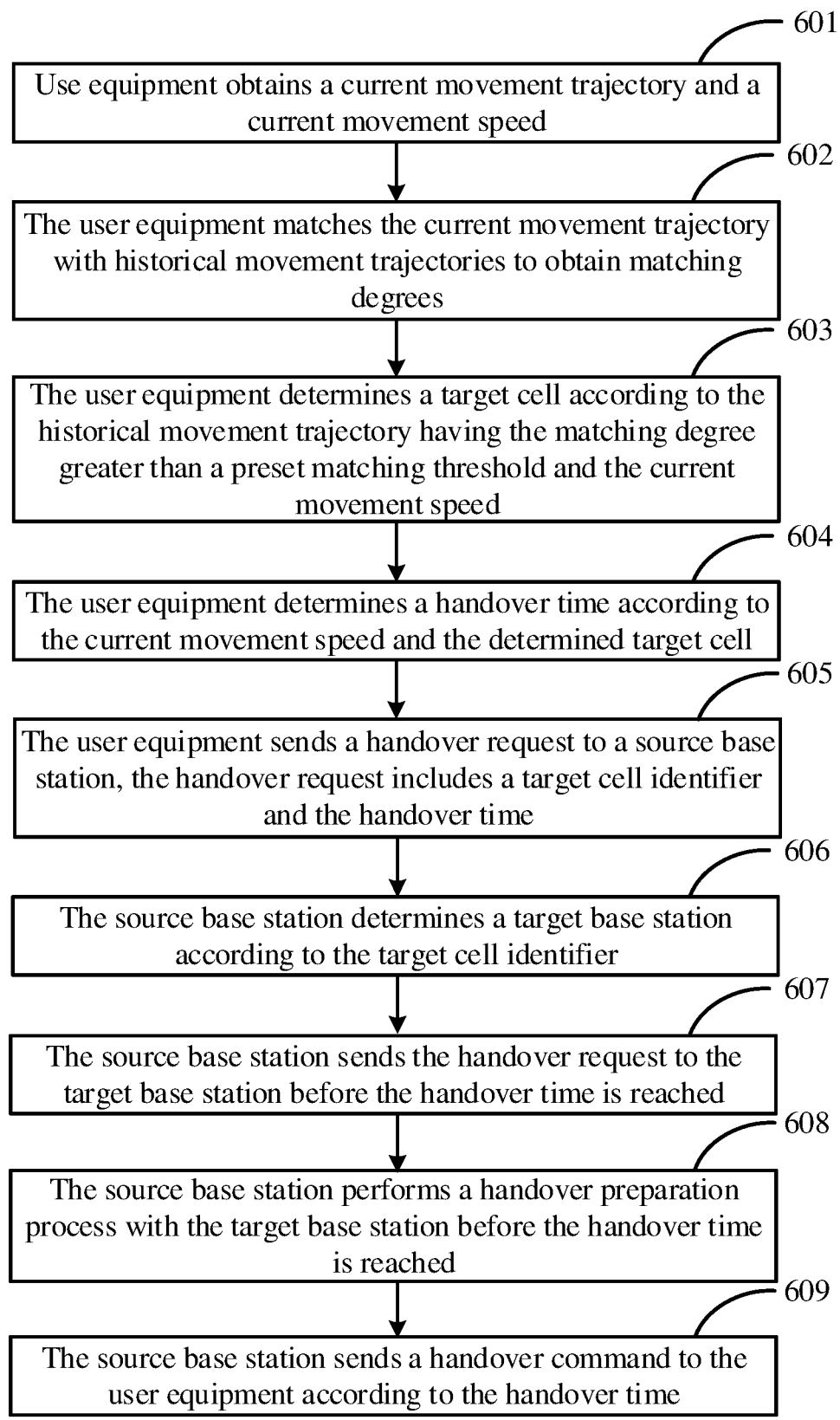
FIG. 6 is a flow chart showing a method for processing cell handover according to an exemplary embodiment.

FIG. 6 is a flow chart showing a method for processing cell handover according to an exemplary embodiment. The method includes the following operations 601 to 609.

In 601, user equipment obtains a current movement trajectory and a current movement speed.

In 602, the user equipment matches the current movement trajectory with historical movement trajectories to obtain matching degrees.

In 603, the user equipment determines a target cell according to the historical movement trajectory of the matching degree greater than a preset matching threshold, the current movement speed, and correspondences among historical movement trajectories, movement speeds and cells.

In 604, the user equipment determines a handover time according to the current movement speed and the determined target cell.

In 605, the user equipment sends a handover request to a source base station. The handover request includes a target cell identifier and the handover time.

In 606, the source base station determines a target base station based on the target cell identifier.

In 607, the source base station sends the handover request to the target base station before the handover time is reached.

In 608, the source base station executes a handover preparation process with the target base station before the handover time is reached.

In 609, the source base station sends a handover command to the user equipment according to the handover time.

The embodiments described above may be freely combined according to actual needs.

The device embodiments of the disclosure are described below, which may be configured to perform the method embodiments of the disclosure.

Figure 7:
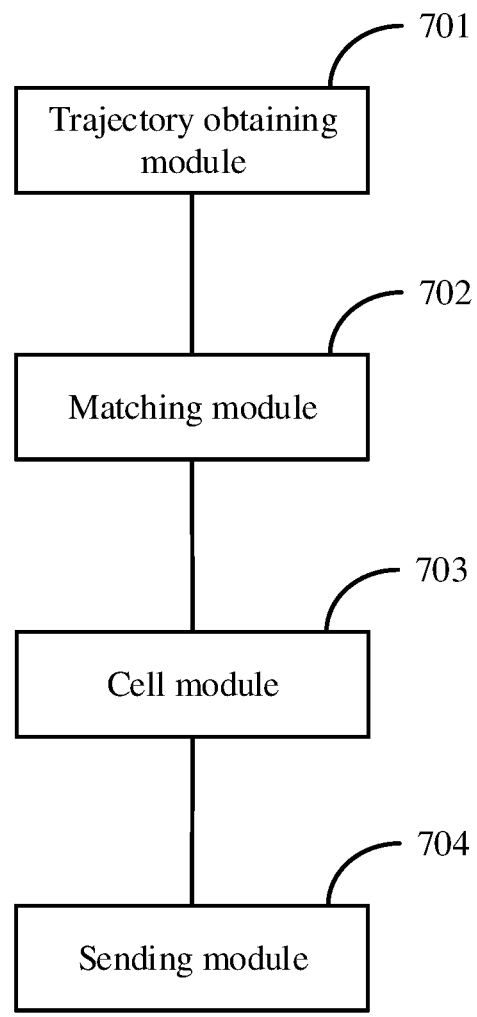
FIG. 7 is a block diagram illustrating a device for processing cell handover according to an exemplary embodiment.

FIG. 7 is a block diagram illustrating a device for processing cell handover according to an exemplary embodiment. The device may be implemented as a part or all of an electronic device by software, hardware, or a combination thereof. The device for processing cell handover is applied to user equipment. Referring to FIG. 7, the device for processing cell handover includes a trajectory obtaining module 701, a matching module 702, a cell module 703 and a sending module 704.

The trajectory obtaining module 701 is configured to obtain a current movement trajectory.

The matching module 702 is configured to match the current movement trajectory with historical movement trajectories to obtain matching degrees.

The cell module 703 is configured to determine a target cell according to the historical movement trajectory of the matching degree greater than a preset matching threshold and correspondences between the historical movement trajectories and cells.

The sending module 704 is configured to send a handover request to a source base station. The handover request includes a target cell identifier of the determined target cell.

Figure 8:
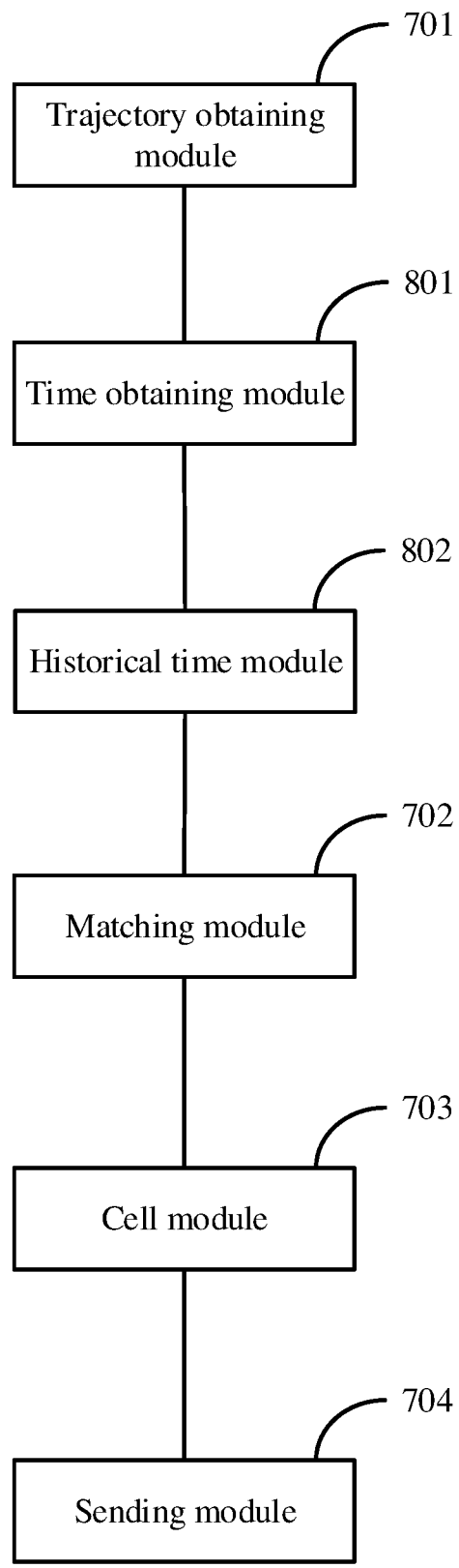
FIG. 8 is a block diagram illustrating a device for processing cell handover according to an exemplary embodiment.

In an embodiment, as shown in FIG. 8, the device further includes: a time obtaining module 801 and a historical time module 802.

The time obtaining module 801 is configured to obtain a current time.

The historical time module 802 is configured to determine a historical time associated with the current time.

Figure 9:
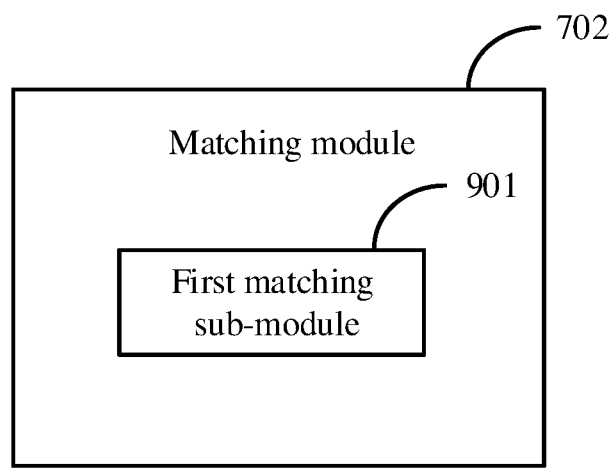
FIG. 9 is a block diagram of a matching module according to an exemplary embodiment.

As shown in FIG. 9, the matching module 702 includes a first matching sub-module 901.

The first matching sub-module 901 is configured to match the current movement trajectory with a historical movement trajectory corresponding to the historical time.

Figure 10:
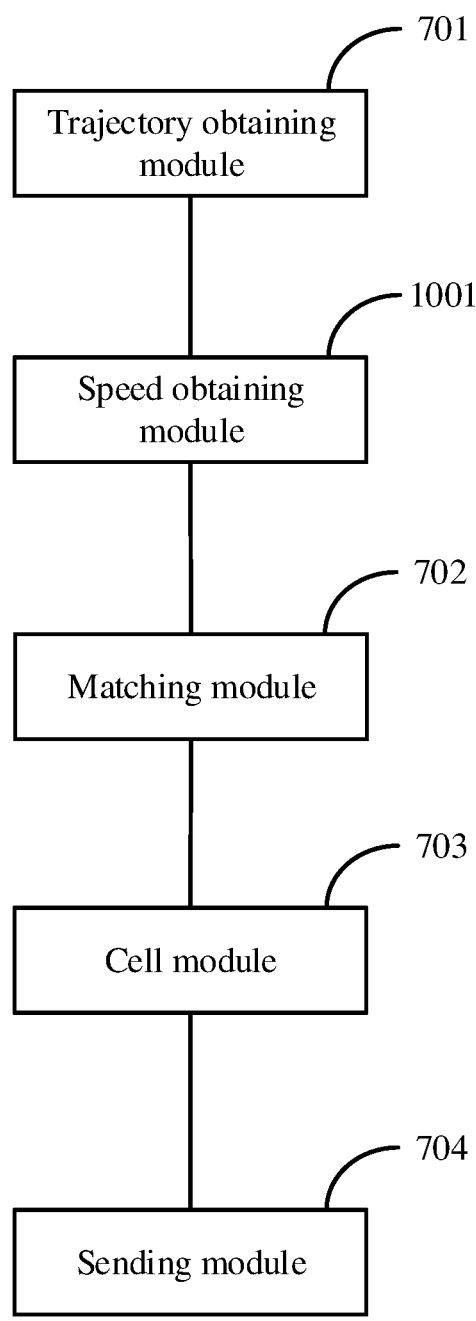
FIG. 10 is a block diagram illustrating a device for processing cell handover according to an exemplary embodiment.

In an embodiment, as shown in FIG. 10, the device further includes: a speed obtaining module 1001.

The speed obtaining module 1001 is configured to obtain a current movement speed.

Figure 11:
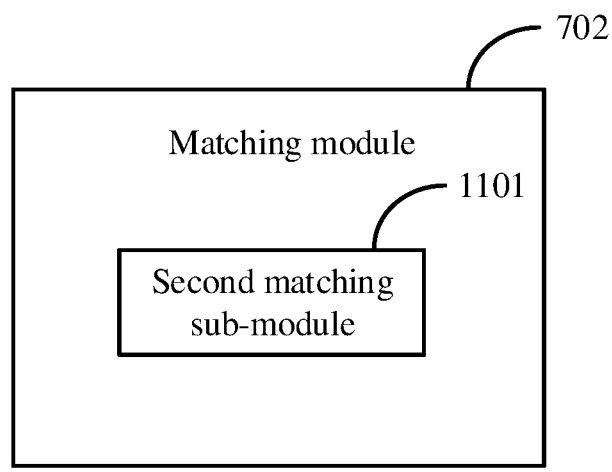
FIG. 11 is a block diagram of a matching module according to an exemplary embodiment.

As shown in FIG. 11, the matching module 702 includes a second matching sub-module 1101.

The second matching sub-module 1101 is configured to determine the target cell according to the historical movement trajectory of the matching degree greater than the preset matching threshold, the current movement speed, and correspondences among historical movement trajectories, movement speeds and cells.

Figure 12:
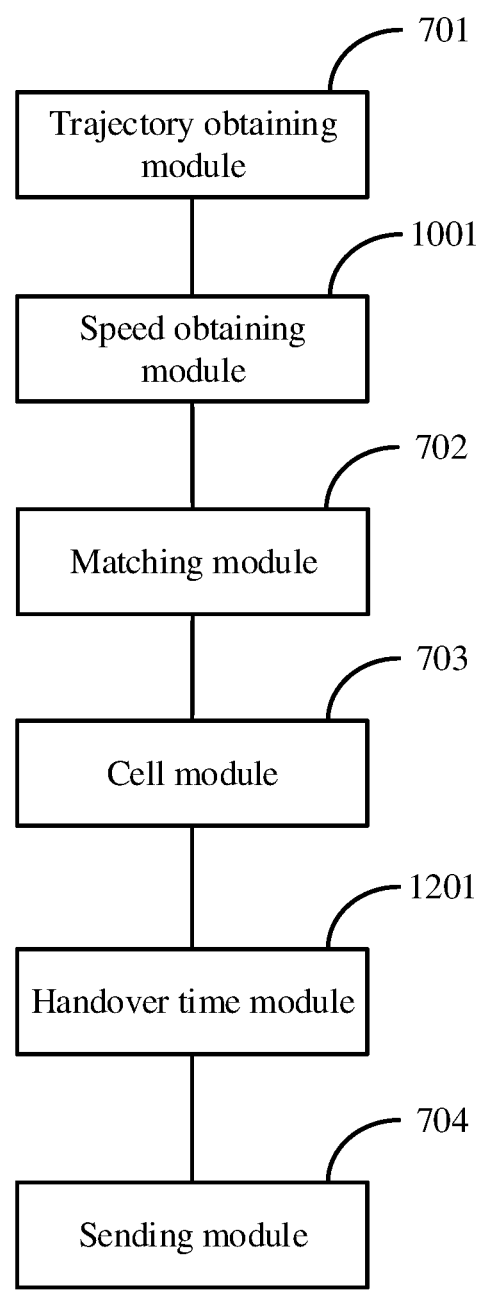
FIG. 12 is a block diagram illustrating a device for processing cell handover according to an exemplary embodiment.

In an embodiment, as shown in FIG. 12, the device further includes a handover time module 1201.

The handover time module 1201 is configured to determine a handover time according to the current movement speed and the determined target cell.

The handover request further includes the determined handover time.

In an embodiment, the handover request further includes a measurement report.

Figure 13:
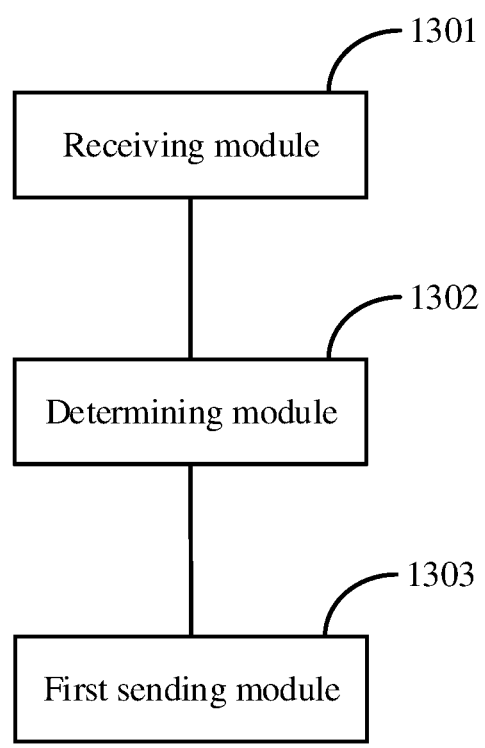
FIG. 13 is a block diagram illustrating a device for processing cell handover according to an exemplary embodiment.

FIG. 13 is a block diagram illustrating a device for processing cell handover according to an exemplary embodiment. The device may be implemented as a part or all of an electronic device by software, hardware, or a combination thereof. The device for processing cell handover is applied to a base station. Referring to FIG. 13, the device for processing cell handover includes a receiving module 1301, a determining module 1302, and a first sending module 1303.

The receiving module 1301 is configured to receive a handover request sent by user equipment. The handover request includes a target cell identifier.

The determining module 1302 is configured to determine a target base station according to the target cell identifier.

The first sending module 1303 is configured to send the handover request to the target base station.

In an embodiment, the handover request further includes a handover time.

Figure 14:
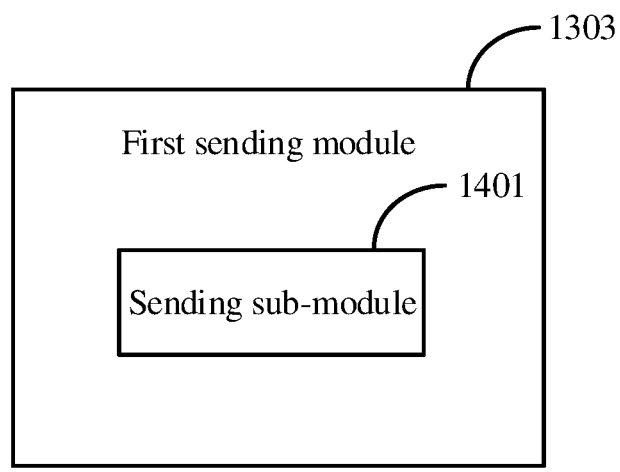
FIG. 14 is a block diagram of a first sending module according to an exemplary embodiment.

As shown in FIG. 14, the first sending module 1303 includes a sending sub-module 1401.

The sending sub-module 1401 is configured to send the handover request to the target base station before the handover time is reached.

Figure 15:
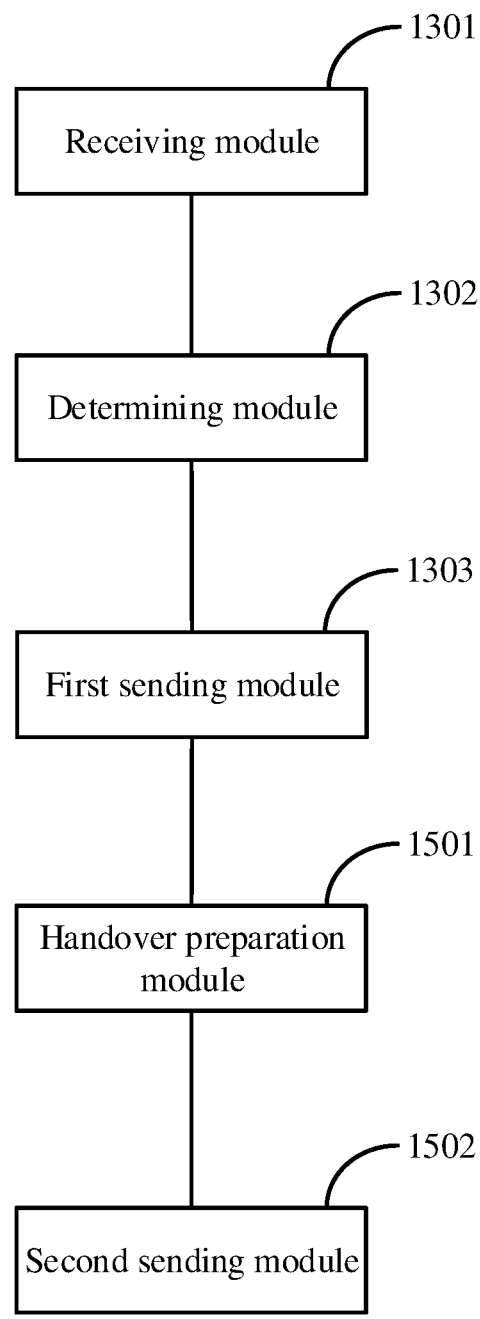
FIG. 15 is a block diagram illustrating a device for processing cell handover according to an exemplary embodiment.

As shown in FIG. 15, the device further includes a handover preparation module 1501 and a second sending module 1502.

The handover preparation module 1501 is configured to execute a handover preparation process with the target base station before the handover time is reached.

The second sending module 1502 is configured to send a handover command to the user equipment according to the handover time.

In an embodiment, the handover request further includes a measurement report.

Figure 16:
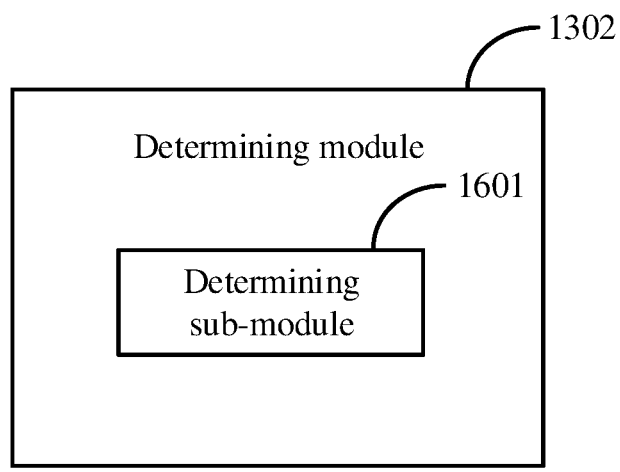
FIG. 16 is a block diagram of a determining module according to an exemplary embodiment.

As shown in FIG. 16, the determining module 1302 includes a determining sub-module 1601.

The determining sub-module 1601 is configured to determine the target base station according to the target cell identifier and the measurement report.

With regard to the device in the above-described embodiments, the specific manner in which the each module perform the operation has been described in detail in the method embodiments, and will not be described in detail herein.

Figure 17:
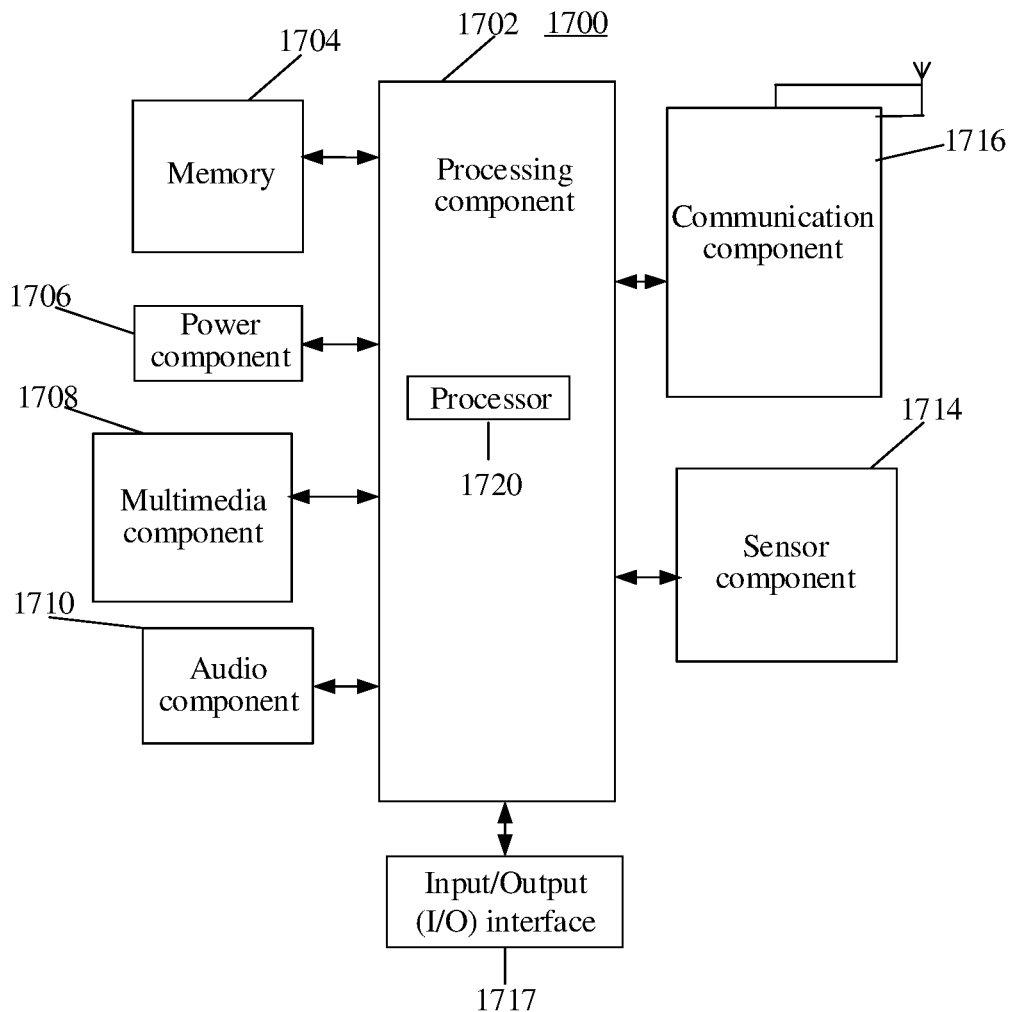
FIG. 17 is a block diagram illustrating a device for processing cell handover according to an exemplary embodiment.

FIG. 17 is a block diagram illustrating a device for processing cell handover, according to an exemplary embodiment. For example, the device 1700 may be a mobile phone, a computer, a digital broadcasting terminal, messaging equipment, a game console, tablet equipment, medical equipment, fitness equipment, and a personal digital assistant.

The device 1700 may include one or more of following components: a processing component 1702, a memory 1704, a power component 1706, a multimedia component 1708, an audio component 1710, an Input/Output (I/O) interface 1717, a sensor component 1714, and a communication component 1716.

The processing component 1702 generally controls overall operations of the device 1700, such as operations related to displaying, telephone calls, data communications, camera operations, and recording operations. The processing component 1702 may include one or more processors 1720 to execute instructions, so as to implement all or part of the operations of the method described above. In addition, the processing component 1702 may include one or more modules to facilitate the interaction between the processing component 1702 and other components. For example, the processing component 1702 may include a multimedia module to facilitate interaction between the multimedia component 1708 and the processing component 1702.

The memory 1704 is configured to store various types of data to support the operation of the device 1700. Examples of such data include instructions for any application program or method operated on the device 1700, contact data, phone book data, messages, pictures, videos, and the like. The memory 1704 may be implemented by any type of volatile or non-volatile storage devices or a combination thereof, such as a Static Random Access Memory (SRAM), an Electrically Erasable Programmable Read-Only Memory (EEPROM), an Electrically Programming Read-Only Memory (EPROM), a Programmable Read-Only Memory (PROM), a Read-Only Memory (ROM), a magnetic memory, a flash memory, a magnetic disk or an optical disk.

The power component 1706 provides power for various components of the device 1700. The power component 1706 may include a power management system, one or more power supplies, and other components associated with generating, managing, and distributing power for the device 1700.

The multimedia component 1708 includes a screen providing an output interface between the device 1700 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touch, swipe, and gestures on the TP. The touch sensors may not only sense a boundary of a touch or swipe action, but also detect a time of duration and a pressure associated with the touch or swipe action. In some embodiments, the multimedia component 1708 includes a front camera and/or a rear camera. The front camera and/or the rear camera may receive external multimedia data when the device 1700 is in an operation mode, such as a photographing mode or a video mode. Each front camera and each rear camera may be fixed optical lens systems or may have focal lengths and optical zoom capabilities.

The audio component 1710 is configured to output and/or input audio signals. For example, the audio component 1710 includes a microphone (MIC), and the microphone is configured to receive an external audio signal when the device 1700 is in an operation mode, such as a calling mode, a recording mode, and a voice identification mode. The received audio signals may be further stored in the memory 1704 or transmitted via the communication component 1716. In some embodiments, the audio component 1710 may further include a speaker to output audio signals.

The I/O interface 1717 provides an interface between the processing component 1702 and peripheral interface modules, which may be keyboards, click wheels, buttons, etc. These buttons may include, but be not limited to, a home button, a volume button, a start button, and a lock button.

The sensor component 1714 includes one or more sensors configured to provide various aspects of state assessment for the device 1700. For example, the sensor component 1714 may detect an on/off status of the device 1700, and relative positioning of components. For example, the component is a display and a keypad of the device 1700. The sensor component 1714 may also detect a change in position of the device 1700 or a component of the device 1700, presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include light sensors, such as CMOS or CCD image sensors, for imaging applications. In some embodiments, the sensor component 1714 may also include an acceleration sensor, a gyroscope sensor, a magnetic sensor, a pressure sensor, or a temperature sensor.

The communication component 1716 is configured to facilitate wired or wireless communications between the device 1700 and another device. The device 1700 may access a wireless network based on a communication standard, such as a Wi-Fi, a 2G or a 3G, or a combination thereof. In an exemplary embodiment, the communication component 1716 receives a broadcast signal or broadcasts related information from an external broadcast management system via a broadcast channel. In one exemplary embodiment, the communication component 1716 further includes a Near Field Communication (NFC) module to promote short-range communications. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In the exemplary embodiment, the device 1700 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to implement the above method.

In the exemplary embodiment, a non-transitory computer-readable storage medium including an instruction, such as a memory 1704 including an instruction, is further provided. The instruction may be executed by a processor 1720 of the device 1700 to implement the foregoing method. For example, the non-transitory computer-readable storage medium may be a Read Only Memory (ROM), a Random Access Memory (RAM), a CD-ROM, a magnetic tape, a floppy disc, an optical data storage device, and the like.

In an exemplary embodiment, a device for processing cell handover is provided, including: a processor; and a memory configured to store processor-executable instructions.

The processor is configured to: obtain a current movement trajectory; match the current movement trajectory with historical movement trajectories to obtain matching degrees; determine a target cell according to the historical movement trajectory of the matching degree greater than a preset matching threshold and correspondences between the historical movement trajectories and cells; and send a handover request to a source base station, the handover request including a target cell identifier of the determined target cell.

The processor may further be configured as follows. The method further includes operations as follows.

A current time is obtained.

A historical time associated with the current time is determined.

The operation that the current movement trajectory is matched with the historical movement trajectories includes an operation that the current movement trajectory is matched with a historical movement trajectory corresponding to the historical time.

The processor may further be configured as follows.

The method further includes operations as follows.

A current movement speed is obtained.

The operation that the target cell is determined according to the historical movement trajectory of the matching degree greater than the preset matching threshold and the correspondences between historical movement trajectories and cells includes an operation that the target cell is determined according to the historical movement trajectory of the matching degree greater than the preset matching threshold, the current movement speed, and correspondences among the historical movement trajectories, the movement speeds and the cells.

The processor may further be configured as follows

The method further includes an operation that a handover time is determined according to the current movement speed and the determined target cell.

The handover request further includes the determined handover time.

The processor may further be configured as follows.

The handover request further includes a measurement report.

A computer-readable storage medium having stored thereon instructions which, when executed by a processor of a device, cause the device to implement the above-described method for processing cell handover. The method includes operations as follows.

A current movement trajectory is obtained.

The current movement trajectory is matched with historical movement trajectories to obtain matching degrees.

A target cell is determined according to a historical movement trajectory of the matching degree greater than a preset matching threshold and correspondences between historical movement trajectories and cells.

A handover request is sent to a source base station. The handover request includes a target cell identifier of the determined target cell.

The instructions in the storage medium may further include the following operations.

The method further includes the following operations.

A current time is obtained.

A historical time associated with the current time is determined.

The operation that the current movement trajectory is matched with the historical movement trajectories includes an operation that the current movement trajectory is matched with the historical movement trajectory corresponding to the historical time.

The instructions in the storage medium may further include the following operation.

The method further includes the following operation.

A current movement speed is obtained.

The operation that the target cell is determined according to the historical movement trajectory of the matching degree greater than the preset matching threshold and the correspondences between the historical movement trajectories and the cells includes an operation that the target cell is determined according to the historical movement trajectory of the matching degree greater than the preset matching threshold, the current movement speed, and a correspondences among the historical movement trajectories, the movement speeds and the cells.

The instructions in the storage medium may further include an operation as follows.

The method further includes an operation as follows.

A handover time is determined according to the current movement speed and the determined target cell.

The handover request further includes the determined handover time.

The instructions in the storage medium may further include that the handover request further includes a measurement report.

Figure 18:
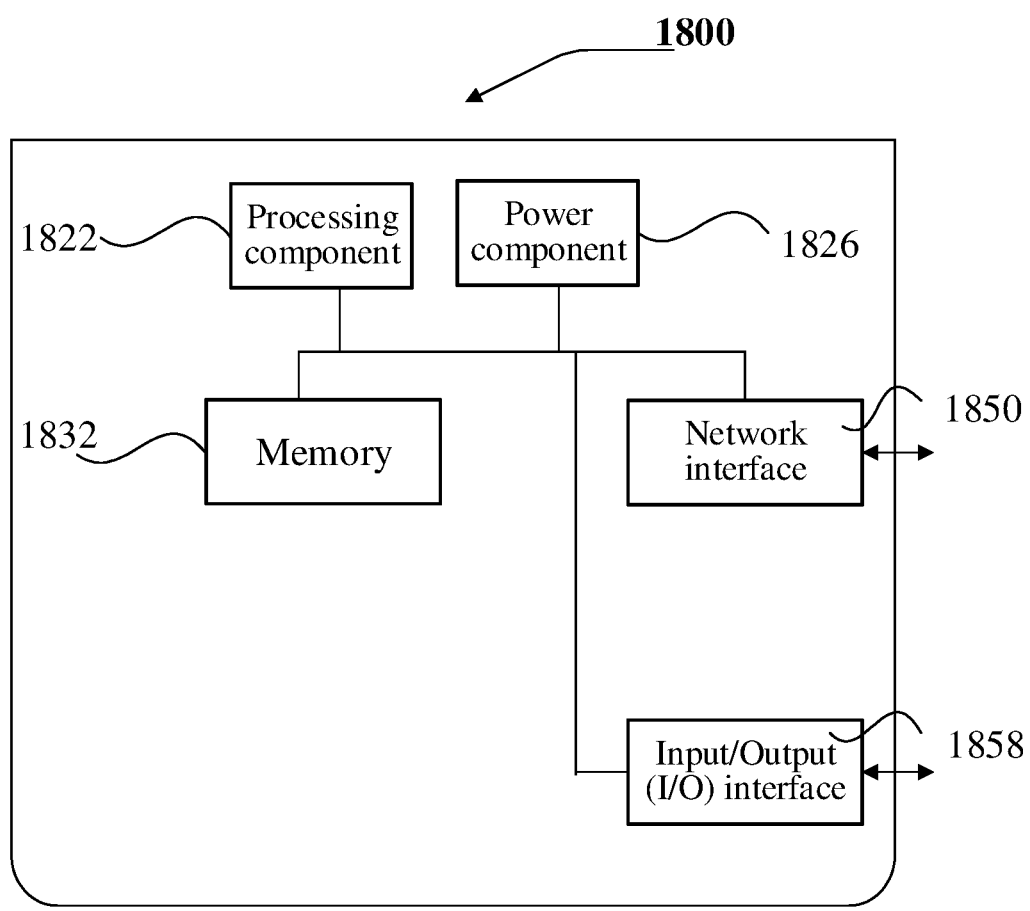
FIG. 18 is a block diagram illustrating a device for processing cell handover according to an exemplary embodiment.

FIG. 18 is a block diagram of a device 1800 for synchronizing data according to an exemplary embodiment. For example, the device 1800 1800 may be provided as a computer. Referring to FIG. 18, the device 1800 1800 includes a processing component 1822, and further includes one or more processors, and memory resources represented by a memory 1832 for storing instructions, such as application programs, executable by the processing component 1822. The application programs stored in the memory 1832 may include one or more modules each of which corresponds to a set of instructions. In addition, the processing component 1822 is configured to execute instructions to perform a method for synchronizing data.

The device 1800 may further include a power component 1826 configured to perform power management for the device 1800, a wired or wireless network interface 1850 configured to connect the device 1800 to a network, and an input/output (I/O) interface 1858. The device 1800 may operate an operating system stored in the memory 1832, such as Windows Server™, Mac OS X™, Unix™, Linux™, FreeBSD™, or the like.

In an exemplary embodiment, a device for processing cell handover is provided, including: a processor; and a memory configured to store processor-executable instructions.

The processor is configured to: receive a handover request sent by user equipment, the handover request including a target cell identifier; determine a target base station according to the target cell identifier; and send the handover request to the target base station.

The processor may further be configured as follows.

The handover request further includes a handover time.

The operation that the handover request is sent to the target base station includes an operation that the handover request is sent to the target base station before the handover time is reached.

The method further includes operations as follows.

A handover preparation process is executed with the target base station before the handover time is reached.

A handover command is sent to the user equipment according to the handover time.

The processor may further be configured as follows.

The handover request further includes a measurement report.

The operation that the target base station is determined according to the target cell identifier includes an operation as follows.

The target base station is determined according to the target cell identifier and the measurement report.

A computer-readable storage medium having instructions is provided. The instructions, when executed by a processor of a device, cause the device to implement the above-described method for processing cell handover. The method includes operations as follows.

A handover request sent by user equipment is received. the handover request includes a target cell identifier.

A target base station is determined according to the target cell identifier.

A handover request is sent to the target base station.

The instructions in the storage medium may further include that the handover request further includes a handover time.

The operation that a handover request is sent to the target base station includes an operation as follows.

The handover request is sent to the target base station before the handover time is reached.

The method further includes operations as follows.

A handover preparation process is executed with the target base station before the handover time is reached.

A handover command is sent to the user equipment according to the handover time.

The instructions in the storage medium may further include that the handover request further includes a measurement report.

The operation that the target base station is determined according to the target cell identifier includes an operation as follows.

The target base station is determined according to the target cell identifier and the measurement report.

Other embodiments of the disclosure will readily occur to those skilled in the art upon consideration of the specification and practice of the disclosure disclosed herein. The present disclosure is intended to cover any variation, usage or adaptation of the disclosure, which follows the general principles of the disclosure and includes common knowledge or conventional technical means in the technical field not disclosed in the disclosure. The specification and the embodiments are considered to be exemplary only, with a true scope and spirit of the disclosure being indicated by the following claims.

It should be understood that the disclosure is not limited to the exact construction that has been described above and illustrated in the accompanying drawings, and that various modifications and changes may be made without departing from the scope thereof. The scope of the disclosure is limited only by the appended claims.

What is claimed is:

1. A method for processing cell handover, applicable to user equipment side and comprising:
    obtaining a current movement trajectory;
    matching the current movement trajectory with historical movement trajectories to obtain matching degrees;
    determining a target cell according to the historical movement trajectory of the matching degree greater than a preset matching threshold, and correspondences between historical movement trajectories and cells; and
    sending a handover request to a source base station, the handover request comprising a target cell identifier of the determined target cell,
    wherein the method further comprises:
    obtaining a current movement speed,
    wherein the determining the target cell according to the historical movement trajectory of the matching degree greater than the preset matching threshold, and correspondences between historical movement trajectories and cells comprises:
    determining the target cell according to the historical movement trajectory of the matching degree greater than the preset matching threshold, the current movement speed, and correspondences among historical movement trajectories, movement speeds and cells,
    wherein in response to that the movement speed is in a first speed range, a microcell covering the movement trajectory is determined as the target cell, in response to that the movement speed is in a second speed range, a cell covering the movement trajectory is determined as the target cell; and in response to that the movement speed is in a third speed range, a macro cell covering the movement trajectory is determined as the target cell.

2. The method of claim 1, further comprising:
obtaining a current time; and
determining a historical time associated with the current time,
wherein the matching the current movement trajectory with the historical movement trajectories comprises:
matching the current movement trajectory with the historical movement trajectory corresponding to the historical time.

3. The method of claim 1, further comprising:
determining a handover time according to the current movement speed and the determined target cell,
wherein the handover request further comprises the determined handover time.

4. The method of claim 1, wherein the handover request further comprises a measurement report.

5. A non-transitory computer-readable storage medium having stored therein computer instructions that, when executed by a processor, implement the method of claim 1.

6. A method for processing cell handover, applicable to a base station side and comprising:
receiving a handover request sent by user equipment, the handover request comprising a target cell identifier;
determining a target base station according to the target cell identifier; and
sending the handover request to the target base station,
wherein the handover request further comprises a handover time, and
the sending the handover request, to the target base station comprises:
sending the handover request to the target base station before the handover time is reached,
wherein the method further comprises:
executing a handover preparation process with the target base station before the handover time is reached; and
sending a handover command to the user equipment according to the handover time,
wherein the handover preparation process comprises: receiving a handover response message from the target base station, wherein the handover response message comprises a new C-RNTI and a security algorithm identifier of the target base station.

7. The method of claim 6, wherein the handover request further comprises a measurement report; and
the determining the target base station according to the target cell identifier comprises:
determining the target base station according to the target cell identifier and the measurement report.

8. A device for processing cell handover, applicable to a base station and comprising a processor; and memory configured to store processor-executable instructions, wherein the processor is configured to execute the instructions to implement operations of the method of claim 6.

9. The device of claim 8, wherein the handover request further comprises a measurement report; and
wherein the processor is further configured to execute the instructions to:
determine the target base station according to the target cell identifier and the measurement report.

10. A non-transitory computer-readable storage medium having stored therein computer instructions that, when executed by a processor, implement the method of claim 6.

11. A device for processing cell handover, applicable to user equipment and comprising:
a processor;
memory configured to store processor-executable instructions,
wherein the processor is configured to execute the instructions to:
obtain a current movement trajectory;
match the current movement trajectory with historical movement trajectories to obtain matching degrees;
determine a target cell according to the historical movement trajectory of the matching degree greater than a preset matching threshold, and correspondences between historical movement trajectories and cells; and
send a handover request to a source base station, the handover request comprising a target cell identifier of the determined target cell,
wherein the processor is further configured to execute the instructions to:
obtain a current movement speed,
determine the target cell according to the historical movement trajectory of the matching degree greater than the preset matching threshold, the current movement speed, and correspondences among historical movement trajectories, movement speeds and the cells,
wherein in response to that the movement speed is in a first speed range, a microcell covering the movement trajectory is determined as the target cell; in response to that the movement speed is in a second speed range, a cell covering the movement trajectory is determined as the target cell and in response to that the movement speed is in a third speed range, a macro cell covering the movement trajectory is determined as the target cell.

12. The device of claim 11, wherein the processor is further configured to execute the instructions to:
obtain a current time; and
determine a historical time associated with the current time,
match the current movement trajectory with the historical movement trajectory corresponding to the historical time.

13. The device of claim 11, wherein the processor is further configured to execute the instructions to:
determine a handover time according to the current movement speed and the determined target cell,
wherein the handover request further comprises the determined handover time.

14. The device of claim 11, wherein the handover request further comprises a measurement report.

* * * * *